United States Patent
Dooley

(10) Patent No.: US 7,625,435 B2
(45) Date of Patent: Dec. 1, 2009

(54) ELECTROSTATIC AIR/OIL SEPARATOR FOR AIRCRAFT ENGINE

(75) Inventor: Kevin Allan Dooley, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 404 days.

(21) Appl. No.: 11/534,256

(22) Filed: Sep. 22, 2006

(65) Prior Publication Data
US 2008/0072755 A1 Mar. 27, 2008

(51) Int. Cl.
*B03C 3/88* (2006.01)
(52) U.S. Cl. ............... 96/50; 95/68; 95/74; 95/78; 96/60; 96/62; 96/65
(58) Field of Classification Search ............... 96/50, 96/60, 62, 65; 95/68, 74, 78
See application file for complete search history.

(56) References Cited

U.S. PATENT DOCUMENTS

| 342,548 | A | 5/1886 | Walker |  |
|---|---|---|---|---|
| 1,067,974 | A | 7/1913 | Cottrell |  |
| 2,000,654 | A | 5/1935 | Wintermute |  |
| 3,070,977 | A | 1/1963 | Kimmel et al. |  |
| 3,271,932 | A | 9/1966 | Newell |  |
| 3,406,669 | A | 10/1968 | Edwards |  |
| 4,222,748 | A * | 9/1980 | Argo et al. | 95/64 |
| 4,376,637 | A * | 3/1983 | Yang | 95/74 |
| 4,588,423 | A * | 5/1986 | Gillingham et al. | 96/43 |
| 5,429,669 | A | 7/1995 | Chang |  |
| 5,484,473 | A * | 1/1996 | Bontempi | 96/65 |
| 5,855,652 | A * | 1/1999 | Talley | 96/44 |
| 5,911,213 | A | 6/1999 | Ahlborn et al. |  |
| 6,096,118 | A * | 8/2000 | Altman et al. | 96/50 |
| 6,221,136 | B1 | 4/2001 | Liu et al. |  |
| 6,224,653 | B1 | 5/2001 | Shvedchikov et al. |  |
| 6,736,878 | B2 * | 5/2004 | Hein | 95/74 |
| 7,112,236 | B2 * | 9/2006 | Hoverson et al. | 95/78 |
| 7,264,658 | B1 * | 9/2007 | Heckel et al. | 96/62 |
| 2008/0078291 | A1 * | 4/2008 | Daukant | 95/69 |

FOREIGN PATENT DOCUMENTS

| CA | 2500732 | 4/2005 |  |
|---|---|---|---|
| EP | 0 157 089 | 1/1985 |  |
| EP | 0313504 A2 | 4/1989 |  |
| JP | 60-129114 A * | 7/1985 | 96/60 |

OTHER PUBLICATIONS

International Search Report dated Dec. 27, 2007 on Applicant's corresponding PCT International Application No. PCT/CA2007/001569.

* cited by examiner

*Primary Examiner*—Richard L Chiesa
(74) *Attorney, Agent, or Firm*—Ogilvy Renault LLP

(57) ABSTRACT

An air/oil separator for use in a gas turbine engine includes a labyrinth path having an air/oil inlet, air outlet and oil outlet, a device for creating an electrical field within the labyrinth path and a device for creating a suction action at the oil outlet to draw liquid oil from the labyrinth path and for delivering the liquid oil under pressure to a pressurized source of oil in the engine.

12 Claims, 4 Drawing Sheets

ELECTROSTATIC AIR/OIL SEPARATOR FOR AIRCRAFT ENGINE

TECHNICAL FIELD

The invention relates generally to an apparatus for separating a liquid in suspension, and more particularly, to an improved air/oil separator for use in a gas turbine engine.

BACKGROUND OF THE ART

Gas turbine engine oil systems require separator for separating air and oil from the air/oil mixture produced during engine operation. These mixtures vary from oil emulsified with air, to air contaminated by droplets of oil. For example, the compressed air streams used in gas turbine engines to pressurize labyrinth seals for the engine main bearings in order to avoid excessive loss of lubricating oil, invariably become contaminated with oil in the form of particles suspended in the air. Loss of contaminated air from the labyrinth seals in the compressor disadvantageously causes fouling of the engine parts and produces noxious and unpleasant contaminates in air drawn from the compressor for cabin pressurization. Engine oil tanks and auxiliary gearboxes contain a pressure above the ambient pressure and need to vent to the atmosphere. The increased loss of lubricating oil from the engine oil tank further disadvantageously necessitates larger capacity oil tanks, thereby adding to the overall weight of the engine, which is particularly a problem relating to aircraft engines. Centrifugal separators have been extensively used in the aircraft industry in attempts to remove the majority of oil mist from compressed air streams. However, efforts have been continuously made in the aircraft industry to improve the efficiency of air/oil separators in gas turbine engine oil systems.

Accordingly, there is a need to provide an improved air/oil separator for use in gas turbine engines.

SUMMARY OF THE INVENTION

It is therefore an object of this invention to provide an air/oil separator for use in a gas turbine engine.

In one aspect, the present invention provides an air/oil separator for use in a gas turbine engine which comprises a labyrinth path having an air/oil inlet, air outlet and oil outlet; means for creating an electrical field within the labyrinth path; and means for creating a suction action at the oil outlet to draw liquid oil from the labyrinth path and for delivering the liquid oil under pressure to a pressurised source of oil in the engine.

In another aspect, the present invention provides an air/oil separator for use in a gas turbine engine, which comprises a casing including an air/oil inlet, air outlet and oil outlet; first and second sets of electrically conductive partitioning members alternately positioned within the casing to define a fluid passage through the casing; the first set of electrically conductive partitioning members being grounded and the second set of electrically conductive partioning members being electrically charged; and a jet pump connected to the oil outlet to draw liquid oil from the passage and deliver same to an oil tank of the engine.

In a further aspect, the present invention provides a method for separating oil from an air/oil mixture for a gas turbine engine, which comprises steps of: 1) directing a flow of the air/oil mixture through a fluid passage defining an electrical field therein to cause precipitation of oil particles suspended in the air/oil mixture; 2) reducing velocities of the flow of the air/oil mixture by means of allowing diffusion of the flow of the air/oil mixture while passing through the fluid passage in order to reduce an amount of suspended oil particles to be carried by a discharged air flow; and 3) creating a suction action in an oil outlet of the fluid passage to draw liquid oil from the fluid passage and for delivering the liquid oil under pressure to a pressurized oil source of the engine.

Further details of these and other aspects of the present invention will be apparent from the detailed description and drawings included below.

DESCRIPTION OF THE DRAWINGS

Reference is now made to the accompanying drawings depicting aspects of the present invention, in which.

DETAILED DESCRIPTION OF THE PREFERRED EMBODIMENTS

Figure 1:
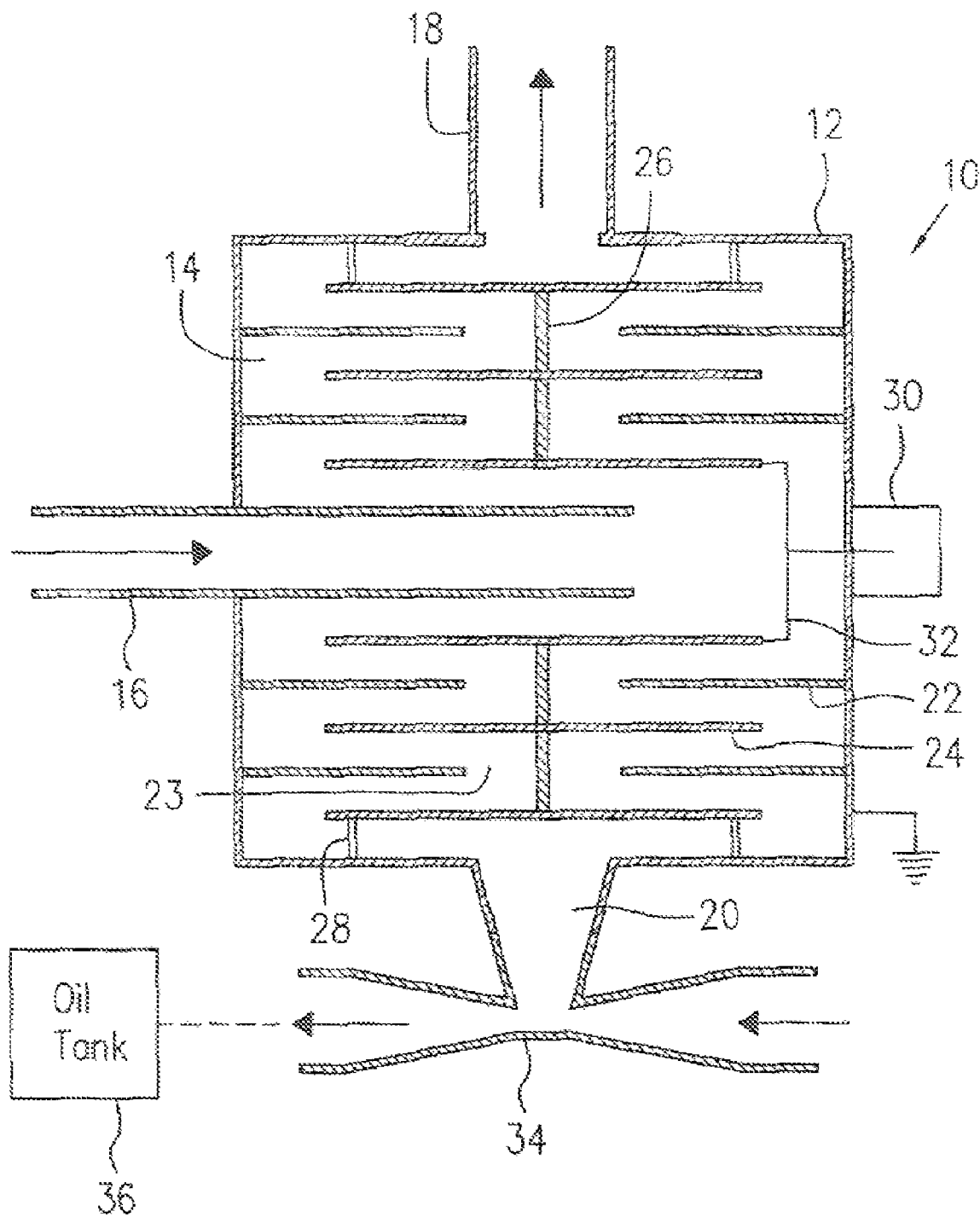
FIG. 1 is a schematic cross-sectional view of an electrostatic air/oil separator according to one embodiment of the present invention.

Referring to FIG. 1, an air/oil separator generally indicated by numeral 10 for use in a gas turbine engine, is illustrated according to one embodiment of the present invention. The air/oil separator 10 generally includes a casing, preferably a cylindrical easing 12 accommodating two sets of electrically conductive partitioning members alternately positioned within the casing 12 to define a fluid passage 14 through the casing 12. The casing 12 is preferably electrically conductive and includes an air/oil inlet 16, air outlet 18 and oil outlet 20. The air outlet 18 is preferably sized larger than the air/oil inlet 16.

In this embodiment, the first set of partitioning members are a plurality of electrically conductive plates 22, preferably directly supported by the electrically conductive casing 12 such that the plates 22 and the casing 12 are electrically connected. For example, each of the plates 22 is configured as an annular ring defining a central aperture 23 and having an outer periphery fit in the casing 12 such that the plate 22 can be co-axially supported within the casing 12, for example, by welding to the inner side of the cylindrical side wall of the casing 12. The plates 22 are axially spaced apart one from another.

In this embodiment, the second set of partitioning members are a plurality of electrically conductive plates 24 which are preferably round plates having a diametrical dimension smaller than the inner diameter of the casing 12 such that the round plates 24 are radially spaced apart from the cylindrical side wall of the casing 12 when the round plates 24 are co-axially positioned within the casing 12. The round plates 24 are axially spaced apart and are connected together, for example in two groups, by a plurality of electrically conductive rods 26. Each rod 26 extends between two adjacent plates 24 and is directly connected, for example by welding, to the center of the respective round plates 24 such that the round electrically conductive plates 24 in each group are electrically connected.

The two groups of axially spaced round plates 24 are positioned within the casing 12 such that the first set of plates 22 and the second set of plates 24 are interleaved, to form, in combination with the casing 12, a labyrinth path which defines the fluid passage 14 through the casing 12. The two groups of electrically connected round plates 24 are supported on but insulated from respective top and bottom walls (not indicated) of the cylindrical casing 12, for example by insulating spacers 28 which, however, do not block the fluid passage 14.

The respective first and second sets of electrically conductive plates 22, 24 are connected to a source of DC voltage 30, with opposite electrical polarities presented on the respective plates 22, 24, to create electrical fields within the casing 12 between the respective sets of plates 22, 24. In this embodiment, the electrically connected first set of plates 22 and the casing 12 are electrically grounded and the electrically connected second set of plates 24 are connected through wires 32 to the DC voltage 30 to be positively charged.

A plurality of small holes (not shown) is preferably provided in the respective plates 22, 24.

It is preferable to locate the air outlet 18 in the top wall of the casing 12 and to locate the oil outlet 20 in the bottom wall of the casing 12. The air/oil inlet 16 preferably includes a tube (not indicated) extending through the cylindrical side wall of the casing 12, at a middle portion thereof into the casing 12, between the two groups of electrically connected plates 24, as shown in FIG. 1.

A pump, preferably a jet pump 34 is connected to the oil outlet 20. The jet pump 34 is connected at the input end thereof to a source of pressurized air or oil and is connected at the output end thereof to an oil tank of a gas turbine engine.

In use, an air/oil mixture, for example from an oil tank of an oil system or from an auxiliary gearbox of a gas turbine engine, is directed into the air/oil separator 10 through the air/oil inlet 16. The oil tank or auxiliary gear box usually contains a pressure higher than the atmosphere and thus under such a pressure differential, the air/oil mixture flows at a velocity thereof into the fluid passage 14 defined through the casing 12 of the air/oil separator 10. Oil particles suspended in the air/oil mixture while passing through the electrical fields created between the electrically grounded plates 22 and walls of the casing 12 and the electrically positively charged plates 24, are charged with ions (positively polarized). The electrically, positively charged oil particles suspended in the air/oil mixture are attracted to the grounded plates 22 and walls of the casing 12, and thus the electric charges of the oil particles are neutralized upon contact with the conductive surfaces of the grounded plates 22 and walls of the casing 12, and are thereby accumulated to form larger oil droplets. The larger oil droplets are further accumulated to form liquid oil which, under the force of gravity is collected on the inner surface of the bottom wall of the casing 12. The small holes provided in the horizontally oriented plates 22, 24 facilitate the collection of the liquid oil on the surface of the bottom wall of the casing 12. The size of the holes is preferably determined so as to allow oil droplets to drain therethrough but to be covered by the oil accumulated on the surfaces of the respective plates 22, 24, to substantially block the air from flowing therethrough. The relatively oil-free air which passes through the fluid passage 14 is then discharged out of the casing 12 through the air outlet 18.

The flow of the air/oil mixture introduced from the air/oil inlet 16, enters the casing 12 at a middle portion thereof and is diffused downwardly and upwardly into the respective lower and upper portions (not indicated) of the casing 12. After separation from the air/oil mixture which is diffused into the lower portion of the casing 12, air eventually rises to the upper portion of the casing 12 and is discharged from the air outlet 18, due to the fact that air is much lighter than oil. In such a configured labyrinth path, particularly having sections directing flow radially inwardly and radially outwardly in an alternate manner, as the flow of the air/oil mixture is diffused within the casing 12, the velocity thereof is significantly reduced. The reduced velocity of the flow is desirable to eliminate or reduce the possibility that an amount of oil particles carried along by the momentum of the flow will pass through the fluid passage 14 too quickly to allow time for oil precipitation within the casing 12.

The jet pump 34 creates a suction action in the oil outlet 20 to draw the liquid oil out of the casing 12 when an air or oil jet is introduced to pass through the throat portion of the jet pump 34. The liquid oil drawn from the oil outlet 20 is then delivered under the pressure created by the introduced air or oil jet, into an oil tank 36 in which the pressure is higher than that of the atmosphere.

The fluid passage 14 which is configured as a labyrinth path, not only provides a means for diffusion of the flow of the air/oil mixture to reduce the velocity thereof, but also provides increased oil precipitation surface area in an electrostatic separator, thereby improving the efficiency within a limited space, which is desirable in the aircraft industry.

Figure 2:
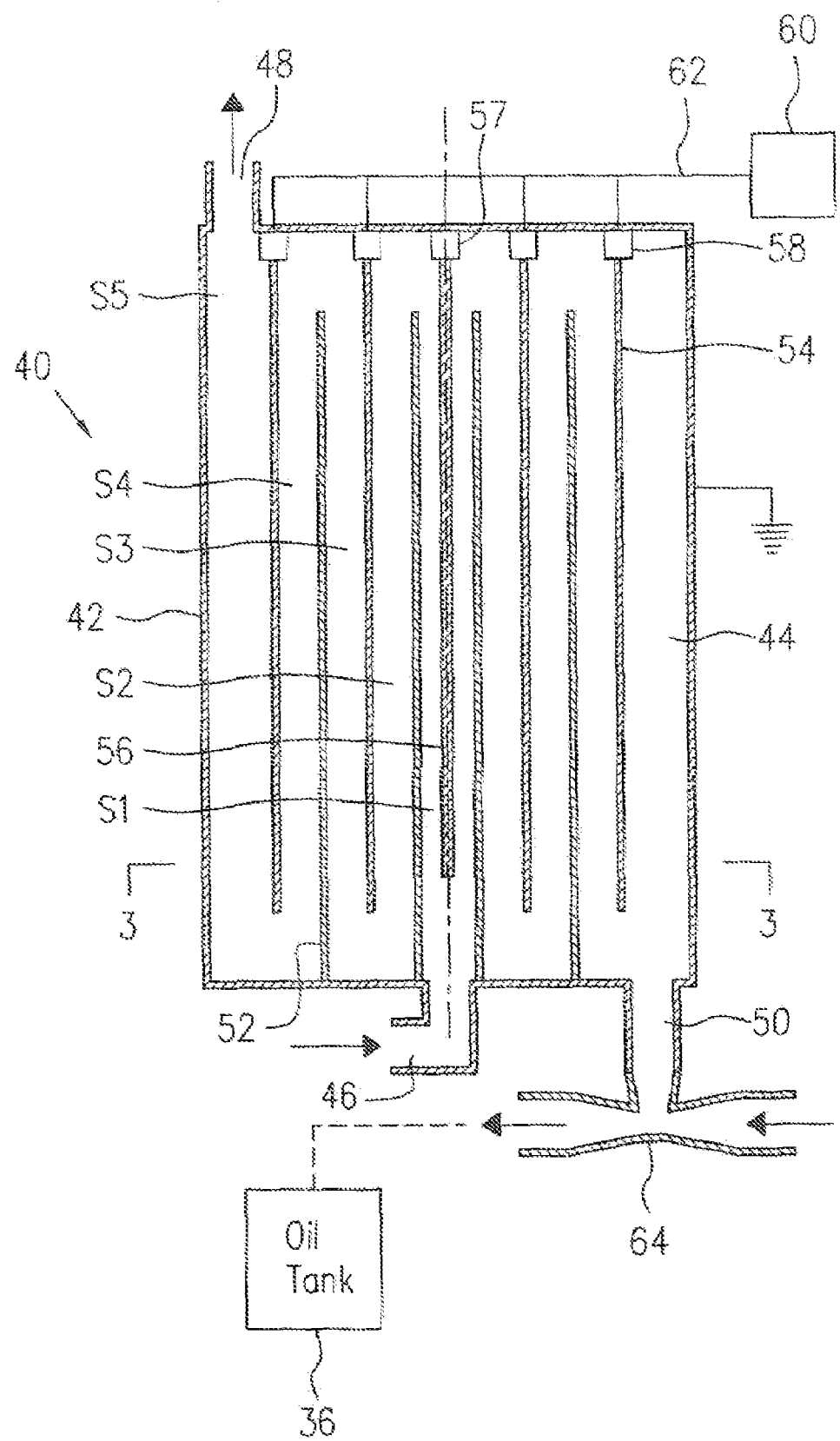
FIG. 2 is a schematic cross-sectional view of an electrostatic air/oil separator according to another embodiment of the present invention.
Figure 3:
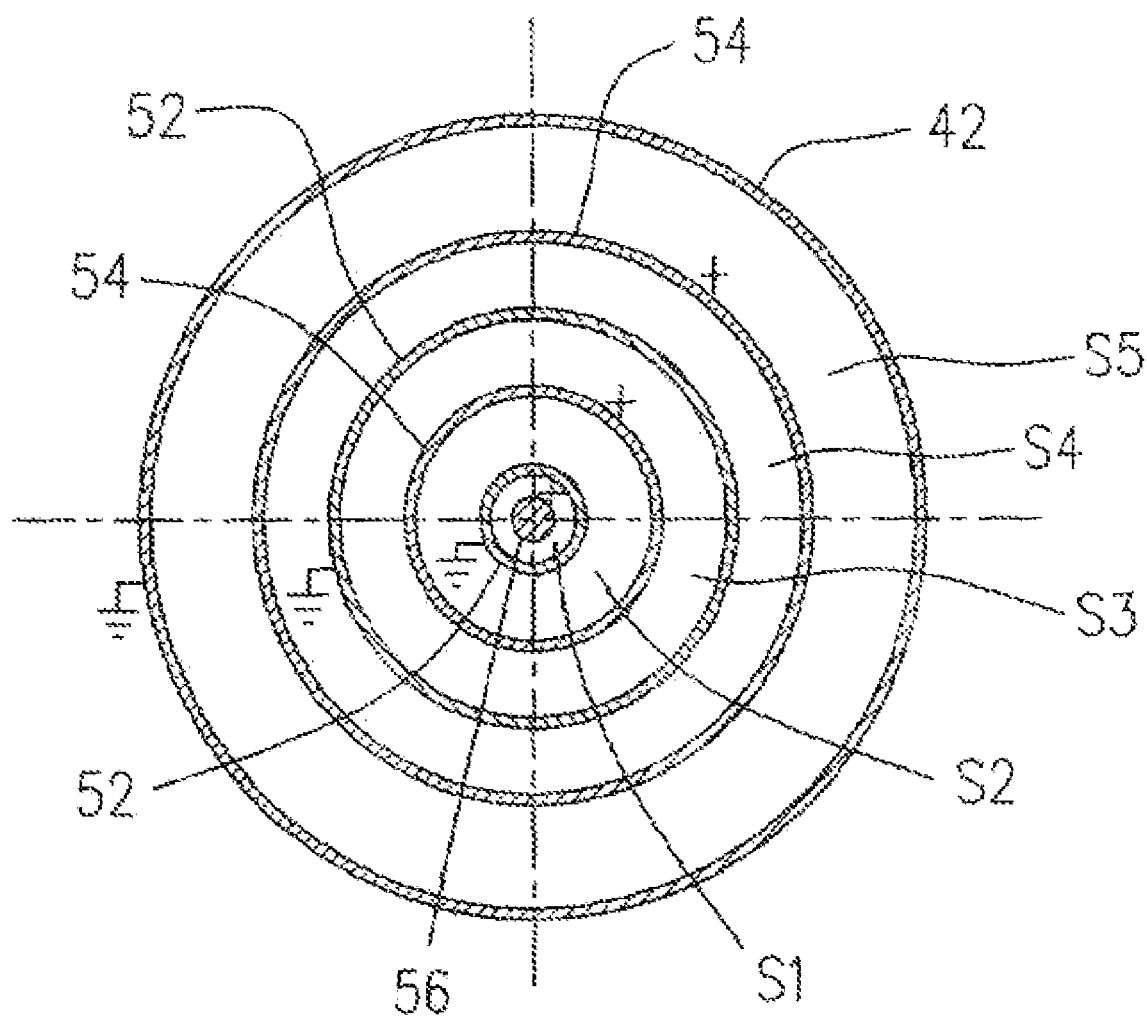
FIG. 3 is a cross-sectional view taken along line 3-3 of FIG. 2, illustrating the axially extending annular passages defined by alternately and co-axially positioned two sets of cylinders, casing and the central rod, and showing the electric polarities of the cylinders, casing and the rod.

Referring to FIGS. 2 and 3, an air/oil separator generally indicated by numeral 40 for use in a gas turbine engine is illustrated according to another embodiment of the present invention. The air/oil separator 40 generally includes a casing, preferably a cylindrical casing 42, and a plurality of partitioning members therein to form a fluid passage 44, similar to the embodiment of the present invention illustrated in FIG. 1. However, in contrast to the embodiment of FIG. 1, the partitioning members of the air/oil separator 40 include first and second sets of electrically conductive cylinders 52, 54 alternately positioned in a co-axial relationship within the cylindrical casing 42, thereby forming an annular labyrinth path through the casing 42.

The casing 42 is preferably electrically conductive and electrically grounded. The casing 42 further includes an air/oil inlet 46, an air outlet 48 and an oil outlet 50.

The first set of electrically conductive cylinders 52 is directly supported, for example by welding to a bottom wall (not indicated) of the electrically grounded casing 42 and is therefore, also electrically grounded. The second set of electrically conductive cylinders 54 is supported on, but electrically insulated from, the top wall of (not indicated) of the casing 42. For example, a plurality of electrical insulation rings 58 are used to secure the top ends of the respective co-axially positioned cylinders 54 to the top wall of the cylindrical casing 42 such that the electrical conductive cylinders 54 are preferably sealingly attached to the top walls of the casing 42 and are also electrically insulated from the grounded casing 42. The electrically conductive cylinders 54 are connected through insulated wires 62, to a high DC voltage source 60 such that an electrically positive polarity if presented thereon.

It is preferable but optional to have an elongate, electrically conductive member, such as a metal rod 56 positioned co-axially among the cylinders 52, 54, which has an electrical polarity opposite to an electrical polarity of an immediately adjacent cylinder. In this embodiment, the immediately adjacent cylinder is the smallest one of the cylinders 52 which is electrically grounded. Therefore, the metal rod 56 is preferably attached to the top wall at the center of the casing 42 by an insulator 57, and is also electrically connected to the high DC voltage source 60 through the insulated wires 62 to present a positive polarity.

As an example of this embodiment of the present invention, two electrically conductive cylinders 52 and two electrically conductive cylinders 54 are illustrated in FIGS. 2 and 3. Cylinders 52 and 54 are alternately and co-axially positioned within the cylindrical casing 42 surrounding the positively charged metal rod 56, thereby forming co-axial annular passages S1, S2, S3, S4 and S5. Each of the annular passages S1-S5 define an electrical field created by the electrically oppositely polarized conductive surfaces of the metal rod 56, the cylinders 52, 54 and the cylindrical walls of the casing 42, as more clearly illustrated in FIG. 3. Each of the annular passages S1-S5 is in fluid communication with an immediately adjacent annular passage, alternately at the respective top and bottom ends of the cylinders 52, 54, as more clearly illustrated in FIG. 2. Therefore, an annular labyrinth path is formed within the cylindrical casing 42.

The air/oil inlet 46 is preferably located at a middle portion of the bottom wall of the casing 42 and is in direct fluid communication with the annular passage S1. The air outlet 48 is preferably located at the top wall of the cylindrical casing 42 near the periphery thereof and is in direct fluid communication with the annular passage S5. The oil outlet 50 is preferably located at the bottom wall of the cylindrical casing 42 near the outer periphery thereof and is in direct fluid communication with the annular passage S5. A pump, preferably a jet pump 64 is connected to the oil outlet 50. The jet pump 64 is connected at the input end thereof to a pressurized air or oil source (not shown) and at the output end thereof to an oil tank 36 of the gas turbine engine.

In use, an air/oil mixture under oil pressure higher than that of the atmosphere, is directed through the air/oil inlet 46 into the co-axial annular passages S1-S5 which define the labyrinth fluid passage 44 within the casing 42. Oil particles suspended in the air/oil mixture are electrically positively charged while passing through the electrical fields formed in the co-axial annular passages S1-S5 and are attracted to the electrically grounded cylinders 52 and the electrically grounded casing 42. The electrically positively charged oil particles are then neutralized upon contact with the conductive surfaces of the grounded cylinders 52 and casing 42, and are accumulated on the surfaces of the electrically grounded cylinders 52 and casing 42 to form oil droplets. The oil droplets are further accumulated to form liquid oil which flows down to the bottom end wall of the casing 42 under the force of gravity. The liquid oil collected on the bottom end wall of the casing 42 is then drawn through the oil outlet 50 due to a suction action in the oil outlet 50 created by an air or oil jet passing through the throat portion of the jet pump 64, to be further delivered under pressure to the oil tank 36 of the gas turbine engine. A plurality of small holes (not shown) are preferably provided in the bottom end of the cylinders 52, to allow the oil collected within annular passages S1-S3 to be drawn therethrough towards the oil outlet 50 which is located in the annular passage S5. The size of the holes is preferably determined so as so allow oil droplets to pass therethrough but to substantially block the air from flowing therethrough by the oil covering the holes, thereby preventing air bypass with respect to the axially extending annular passages S1-S5.

The air flow which passes through the fluid passage 44 formed by the axially extending annular passage S1-S5, is relatively oil-free and is discharged from the air outlet 48. It should be noted that the flow of air/oil mixture enters annular passages S1 first and flows upwards to a top portion of the casing 42 where the flow reverses direction to flow into the annular passage S2. In such a manner, the flow alternately reverses flow directions to flow axially through the annular passages S1 to S5, one after another. The cross-sectional area of the respective annular passages S1-S5 significantly increases one after another as clearly shown in FIG. 3 such that the flow of the air/oil mixture diffuses significantly while passing through the entire fluid passage 44 formed by the axially extending annular passages S1-S5. Therefore, the velocity of the flow is significantly reduced when the flow reaches the air outlet 48, thereby preventing oil particles form being carried out through the air outlet 48.

The air/oil separator 40 may also be configured to be oriented horizontally. In a horizontal orientation, the oil outlet 50 and the air outlet 48 are preferably located in the cylindrical side wall of the casing 42 at respective lowest and highest portions thereof. The small holes to allow liquid oil to be drawn to the oil outlet 50 are preferably provided in every cylinder 52, 54, not only in the end portions, but are distributed at least along the cylinder's length at respective top and lower portions thereof, to function similar to those small holes in the plates of the air/oil separator 10 shown in FIG. 1.

Figure 4:
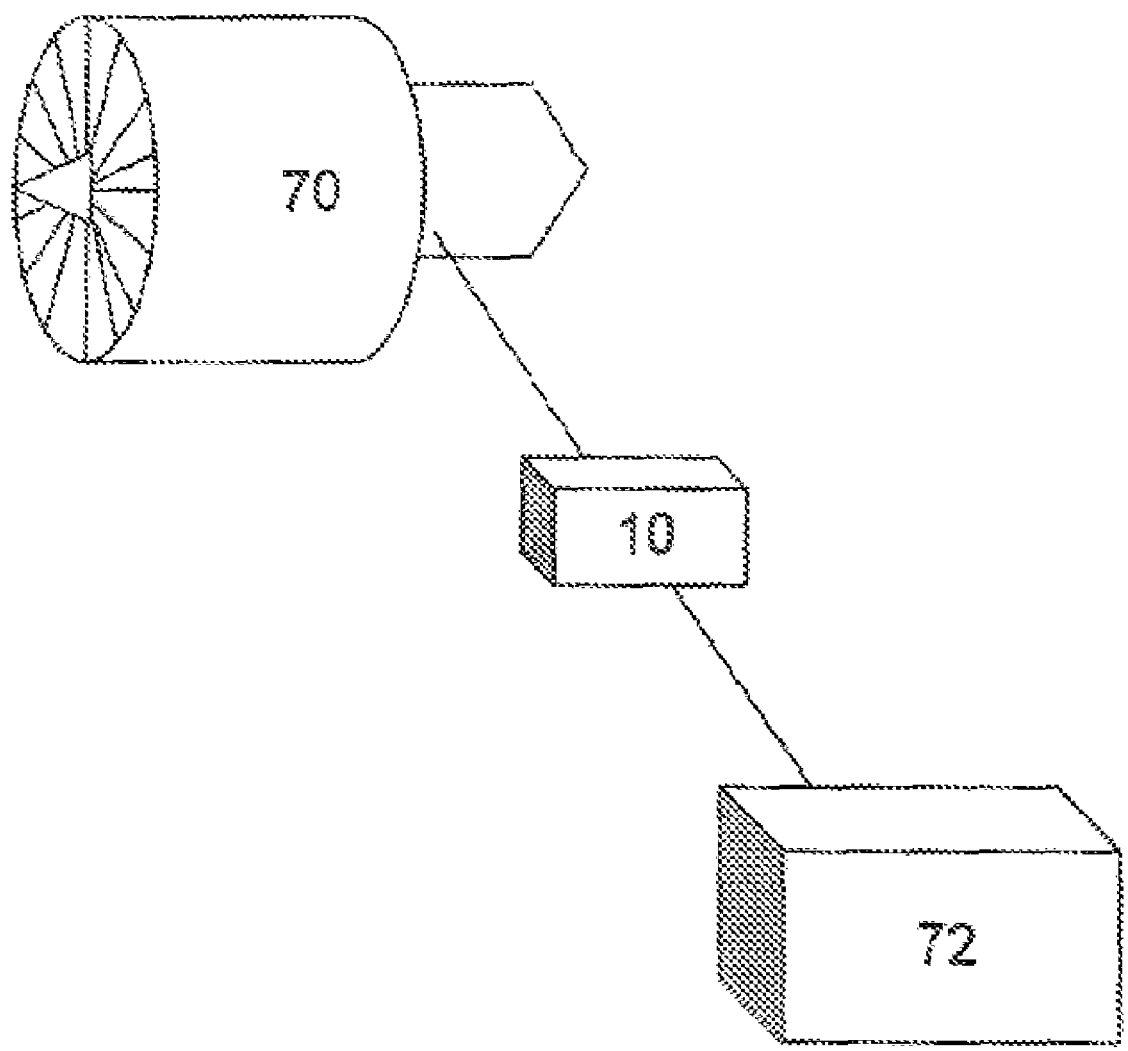
FIG. 4 is a diagrammatical illustration of an application of the electrostatic air/oil separator of the present invention in an aircraft system.

The present air-oil separator may also be applied directly to the pressurized air that is typically bled ("bleed air") from an aircraft gas turbine engine that is normally used as a source of pressurized air for cabin air pressurisation. A prior art problem that arises, from time to time, in aircraft engines is oil contamination of cabin air resulting from oil contamination in the source bleed air, which can pose an inconvenience or health irritant for people inside the aircraft. Referring to FIG. 4, the air-oil separator 10 preferably of this present type may be used to remove oil from bleed air of engine 70 preferably prior to providing the bleed air to an aircraft cabin pressurization system 72, which would significantly reduce or eliminate oil or smoke contamination of the cabin bleed air.

The above description is meant to be exemplary only, and one skilled in the art will recognize that changes may be made to the embodiments described without departure from the scope of the invention disclosed. For example, any type of labyrinth path other than those described above can be configured for an air/oil separator of the present invention. Still other modifications which fall within the scope of the present invention will be apparent to those skilled in the art in light of a review of this disclosure, and such modifications are intended to fall within the appended claims.

The invention claimed is:

1. An air/oil separator for use in a gas turbine engine comprising
   a labyrinth path having an air/oil inlet, air outlet and oil outlet, and including first and second sets of electrically conductive members, electrically insulated one set from another;
   a source of DC voltage electrically connected to the respective first and second sets of electrically conductive members for creating an electrical field within the labyrinth path; and
   a jet pump for creating a suction action at the oil outlet to draw liquid oil from the labyrinth path and for delivering the liquid oil under pressure to a pressurised source of oil in the engine.

2. The air/oil separator as defined in claim 1 wherein the electrically conductive members of the labyrinth path comprise first and second sets of electrically conductive cylinders alternately positioned in a co-axial relationship.

3. An air/oil separator for use in a gas turbine engine comprising:
   a casing including an air/oil inlet, air outlet and oil outlet;

first and second sets of electrically conductive partitioning members alternately positioned within the casing to define a fluid passage through the casing; the first set of electrically conductive partitioning members being grounded and the second set of electrically conductive partitioning members being electrically charged; and a jet pump connected to the oil outlet to draw liquid oil from the passage and deliver same to an oil tank of the engine.

4. The air/oil separator as defined in claim 3 wherein the first and second sets of partitioning members comprise first and second sets of electrically conductive interleaved plates.

5. The air/oil separator as defined in claim 3 wherein the casing is electrically conductive and is grounded.

6. The air/oil separator as defined in claim 5 wherein the first set of members are attached to the casing and the second set of the members are supported within but insulated from the casing.

7. The air/oil separator as defined in claim 6 wherein the air/oil inlet is located in a middle portion at a side wall of the casing, the air outlet is located at a top wall of the casing and the oil outlet is located at a bottom wall of the casing.

8. The air/oil separator as defined in claim 3 wherein the first and second sets of partitioning members comprise first and second sets of electrically conductive cylinders alternately positioned in a co-axial relationship.

9. The air/oil separator as defined in claim 8 wherein the casing is electrically conductive and cylindrical.

10. The air/oil separator as defined in claim 9 wherein the cylinders are positioned co-axially within the cylindrical casing, the first set of cylinders being directly supported on a first end of the casing and the second set of the cylinders being supported on but electrically insulated from a second end of the casing.

11. The air/oil separator as defined in claim 8 wherein the air/oil inlet is adapted to direct a fluid flow directly into an inside of an innermost cylinder.

12. The air/oil separator as defined in claim 8 wherein the casing further accommodates an elongate, electrically conductive member positioned co-axially with the cylinders, the elongate, electrically conductive member having an electric polarity opposite to an electric polarity of an immediately surrounding cylinder.

* * * * *